United States Patent
Venkatraman et al.

(10) Patent No.: US 9,930,563 B2
(45) Date of Patent: Mar. 27, 2018

(54) PROVIDING A QUALITY-OF-SERVICE-BASED SERVICE FROM A CELLULAR NETWORK VIA A WIRELESS SHARING DEVICE

(71) Applicant: Verizon Patent and Licensing Inc., Arlington, VA (US)

(72) Inventors: Shankar Venkatraman, San Jose, CA (US); Lalit R. Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 191 days.

(21) Appl. No.: 14/633,344

(22) Filed: Feb. 27, 2015

(65) Prior Publication Data

US 2016/0255536 A1    Sep. 1, 2016

(51) Int. Cl.
| | |
|---|---|
| *H04B 7/14* | (2006.01) |
| *H04W 28/02* | (2009.01) |
| *H04W 60/04* | (2009.01) |
| *H04W 88/04* | (2009.01) |
| *H04W 40/22* | (2009.01) |
| *H04L 29/06* | (2006.01) |
| *H04W 80/10* | (2009.01) |

(52) U.S. Cl.
CPC ..... *H04W 28/0268* (2013.01); *H04L 65/1016* (2013.01); *H04L 65/1069* (2013.01); *H04L 65/80* (2013.01); *H04W 28/0252* (2013.01); *H04W 28/0257* (2013.01); *H04W 40/22* (2013.01); *H04W 60/04* (2013.01); *H04W 88/04* (2013.01); *H04W 80/10* (2013.01)

(58) Field of Classification Search
CPC ............. H04B 7/2606; H04B 7/15507; H04W 28/0268; H04W 28/24; H04W 40/12; H04W 40/22; H04W 60/04; H04W 76/027; H04W 88/04; H04W 72/087; H04W 28/0252; H04W 28/0257; H04L 65/80
USPC ................................. 370/252, 315, 329, 331
See application file for complete search history.

(56) References Cited

U.S. PATENT DOCUMENTS

| | | | | |
|---|---|---|---|---|
| 2012/0008544 A1* | 1/2012 | Nakagawa | ........... | H04B 7/2606 370/315 |
| 2012/0099461 A1* | 4/2012 | Yi | ........ | H04B 7/2606 370/252 |
| 2013/0258966 A1* | 10/2013 | Tapia | ......... | H04W 72/087 370/329 |
| 2014/0226559 A1* | 8/2014 | Jactat | .............. | H04W 36/0055 370/315 |

(Continued)

*Primary Examiner* — Harun Chowdhury

(57) ABSTRACT

A device associated with a cellular network may receive a request for a quality-of-service based service from a wireless sharing device that is in communication with a user device. The user device may connect with the cellular network via the wireless sharing device. The request may include identification information. The identification information may include a user device identifier and a wireless sharing device identifier. The quality-of-service based service may be provided based on an identified quality-of-service level. The device may establish a bearer based on the request. The bearer may be used by one or more network devices to provide the quality-of-based service, with the quality-of-service level and via the wireless sharing device, to the user device.

20 Claims, 9 Drawing Sheets

(56) References Cited

U.S. PATENT DOCUMENTS

2015/0351147 A1\* 12/2015 Jain .................... H04W 76/027
                                                                       370/329

\* cited by examiner

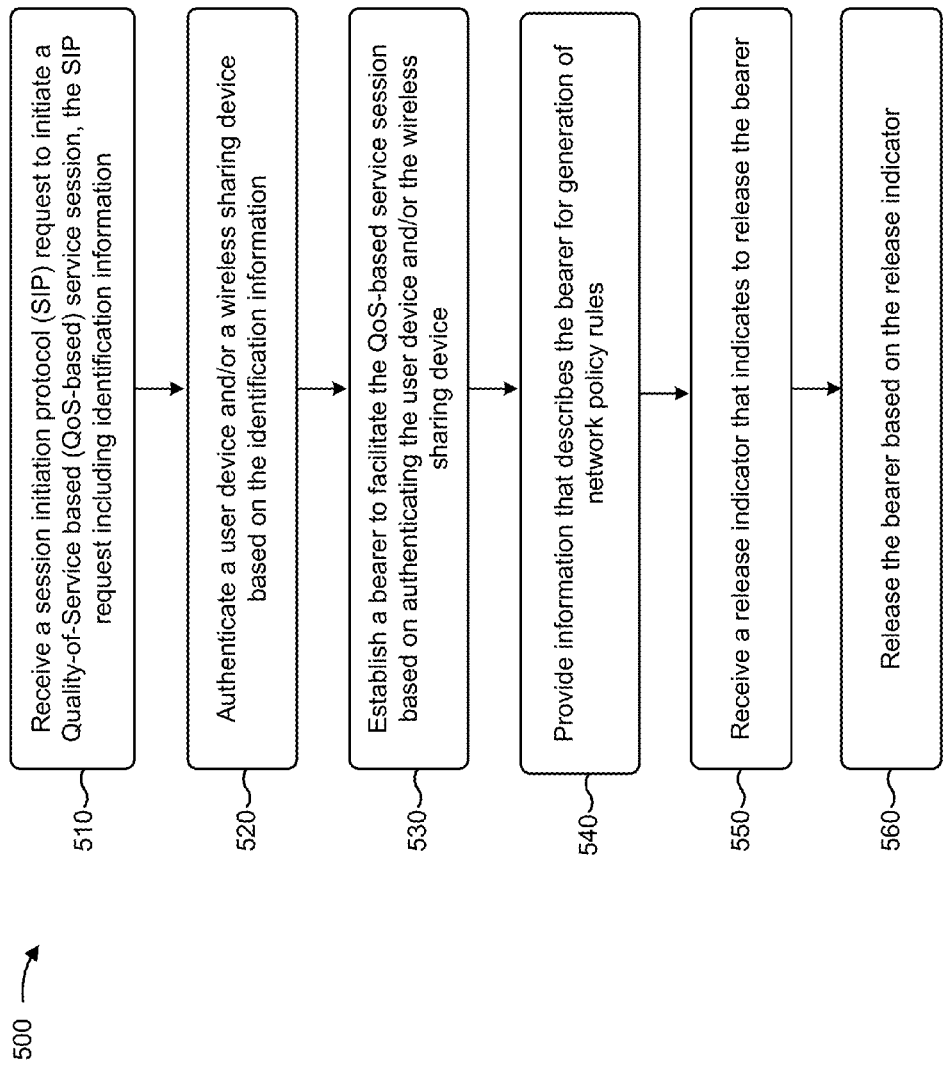

PROVIDING A QUALITY-OF-SERVICE-BASED SERVICE FROM A CELLULAR NETWORK VIA A WIRELESS SHARING DEVICE

BACKGROUND

A network provider may provide a long-term evolution (LTE) network. The network provider, or another party, may provide a service via the LTE network (e.g., a video calling service, a Voice over LTE (VoLTE) service, a video streaming service, or the like). The service may require a particular quality of service (QoS) level, such as a particular bitrate for network traffic associated with the service, a particular latency for network traffic associated with the service, or the like.

BRIEF DESCRIPTION OF THE DRAWINGS

FIG. 5 is a flow chart of an example process for providing a QoS-based service to a user device via a wireless sharing device and using a bearer.

DETAILED DESCRIPTION OF PREFERRED EMBODIMENTS

Figure 1:
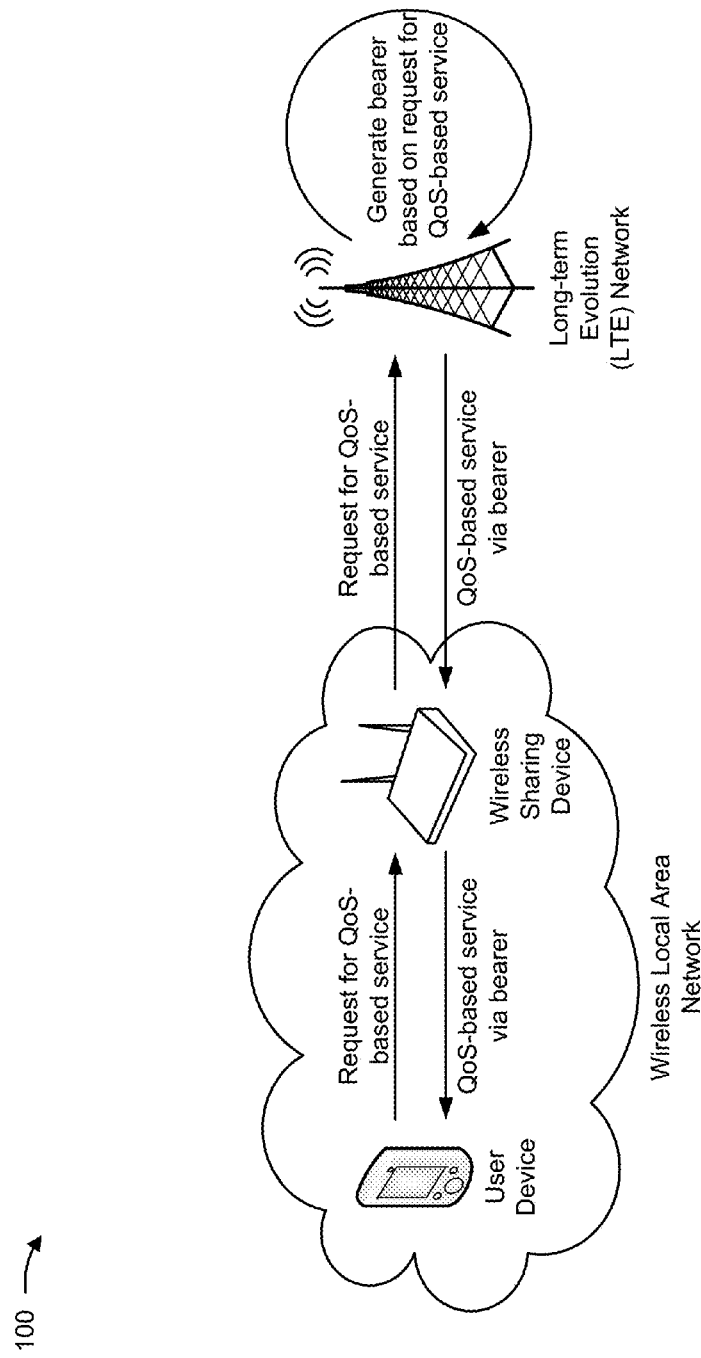
FIG. 1 is a diagram of an overview of an example implementation described herein.

The following detailed description of example implementations refers to the accompanying drawings. The same reference numbers in different drawings may identify the same or similar elements.

A network provider may provide a cellular network, such as a Long-Term Evolution (LTE) network. The network provider, or another party, may provide a service via the LTE network, such as a video calling service, a Voice over LTE (VoLTE) service, a video streaming service, or the like. The service provided via the LTE network may require a particular quality of service (QoS) level, such as a particular bitrate for network traffic associated with the service, a particular latency for network traffic associated with the service, or the like. A service to be provided using a particular QoS level may be referred to herein as a "QoS-based service." A QoS-based service may be provided to a user device via a QoS-based service session. The LTE network may provide the QoS-based service using a bearer that describes a route of network traffic associated with the QoS-based service, a set of network policy rules related to the QoS-based service, or the like.

A wireless sharing device (e.g., an LTE hotspot, a wireless access function provided by a user device, or the like) may provide access to the LTE network. A user device (e.g., user equipment, or the like) that is not directly connected to the LTE network may connect to the LTE network via the wireless sharing device. For example, the user device may connect to the wireless sharing device via a wireless local area network (WLAN), such as a Wi-Fi network, and the wireless sharing device may connect to the LTE network. The user device may request a QoS-based service (e.g., may request a service that an LTE network device determines is a QoS-based service) that is provided via the LTE network. However, the LTE network may not be configured to provide a QoS-based service to the user device via the wireless sharing device (e.g., over the WLAN). For example, the LTE network may not recognize that the QoS-based service is provided to the user device via the wireless sharing device, and thus may not provide the QoS-based service to the wireless sharing device.

Implementations described herein may aid the network provider in providing the QoS-based service to the user device via the wireless sharing device. A network device (e.g., a call session and control function (CSCF) device, or the like) may receive, from the wireless sharing device, a request for the QoS-based service. The network device may determine that the wireless sharing device is associated with the user device. Based on the request for the QoS-based service, and based on determining that the wireless sharing device is associated with the user device, the network device may establish a bearer to cause the LTE network (e.g., one or more network devices of the LTE network) to provide the QoS-based service to the user device via the wireless sharing device. The bearer may define network policy rules to cause the LTE network to provide the QoS-based service to the user device via the wireless sharing device, and to satisfy the QoS requirements. In this way, the user device may receive the QoS-based service via the wireless sharing device, while preserving the particular quality of service, despite not being directly connected to the LTE network.

FIG. 1 is a diagram of an overview of an example implementation 100 described herein. As shown in FIG. 1, a user device (e.g., user equipment, a mobile device, a tablet, a laptop computer, or the like) may connect to an LTE network (e.g., a base station of the LTE network) via a wireless sharing device. As further shown, the user device may provide a request, via the wireless sharing device, for a QoS-based service (e.g., a Voice over Internet Protocol (VoIP) service, a video calling service, a Voice over LTE (VoLTE) service, or the like). As shown, the wireless sharing device may provide the request for the QoS-based service to the LTE network (e.g., via a base station).

Assume that the LTE network authenticates the user device and the wireless sharing device based on receiving the request for the QoS-based service. As shown, the LTE network (e.g., a CSCF device) may establish a bearer based on the request for the QoS-based service. Assume that the bearer causes the LTE network (e.g., one or more network devices) to provide a particular quality of service to the user device, and includes information related to providing the QoS-based service, such as routing information, a particular bitrate for providing the QoS-based service, a particular latency for providing the QoS-based service, or the like.

As further shown in FIG. 1, the LTE network may provide the QoS-based service using the bearer. As shown, the user device may receive the QoS-based service via the wireless sharing device. Assume that the LTE network provides the particular quality of service using the bearer.

Implementations described herein may enable the user device to receive a QoS-based service from an LTE network accessed via a wireless sharing device. The LTE network may provide a particular quality of service associated with the QoS-based service by establishing a bearer for providing the particular quality of service to the user device via the wireless sharing device. In this way, a user device may receive a QoS-based service via a wireless sharing device while preserving the particular quality of service associated with the QoS-based service.

Figure 2:
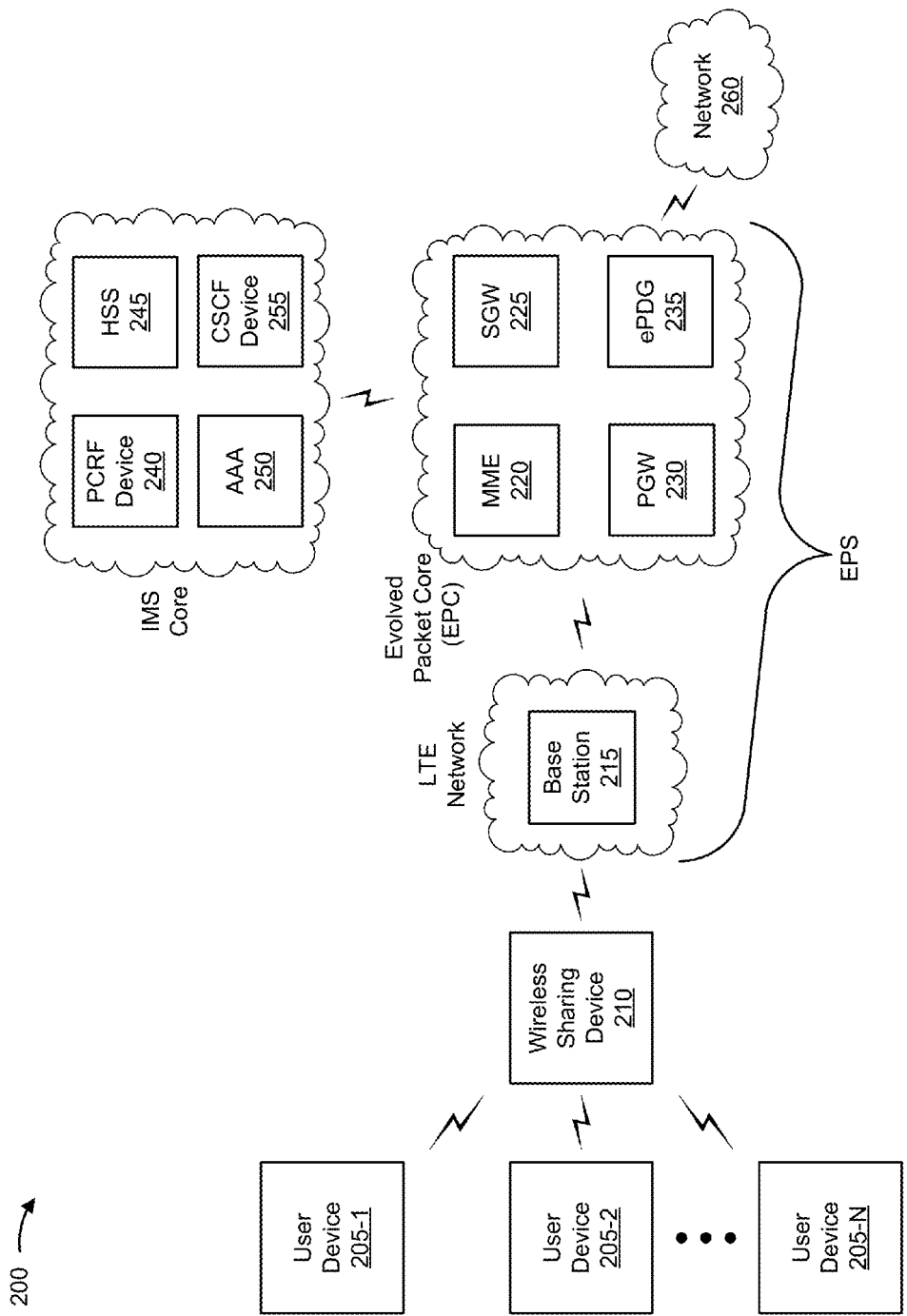
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 205-1 through 205-N (N≥1) (hereinafter referred to collectively as "user devices 205," and individually as "user device 205"), a wireless sharing device 210, a base station 215, a mobility management entity device (MME) 220, a serving gateway (SGW) 225, a packet data network gateway (PGW) 230, an evolved packet data gateway (ePDG) 235, a policy charging and rules function (PCRF) device 240, a home subscriber server (HSS) 245, an authentication, authorization, and accounting server (AAA) 250, a call session and control function (CSCF) device 255, and a network 260. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 215 that take the form of evolved Node Bs (eNBs) via which user device 205 communicates with the EPC. The EPC may include MME 220, SGW 225, PGW 230, and/or ePDG 235 that enable user device 205 to communicate with network 260 and/or an Internet protocol (IP) multimedia subsystem (IMS) core. The IMS core may include PCRF device 240, HSS 245, AAA 250, and/or CSCF device 255, and may manage device registration and authentication, session initiation, etc., associated with user devices 205. HSS 245 and/or AAA 250 may reside in the EPC and/or the IMS core.

User device 205 may include one or more devices capable of communicating with wireless sharing device 210 and/or a network (e.g., network 260). For example, user device 205 may include a wireless communication device, a radiotelephone, a smart phone, a laptop computer, a tablet computer, a personal gaming system, and/or a similar device. User device 205 may send traffic to and/or receive traffic from network 260 (e.g., via wireless sharing device 210, base station 215, SGW 225, PGW 230, and/or ePDG 235). In some implementations, user device 205 may be incapable of or hindered from sending network traffic to and/or receiving network traffic via base station 215. For example, user device 205 may be inside a building, a vehicle, or the like, that may hinder user device 205 from directly connecting to base station 215, or user device 205 may not include a component needed to connect to base station 215.

Wireless sharing device 210 may include one or more devices capable of communicating with user device 205 and base station 215 to provide user device 205 with access to the LTE network. For example, wireless sharing device 210 may include a wireless hotspot, a wireless communication device, a smart phone, a WLAN access point (e.g., a Wi-Fi access point, a Bluetooth enabled device, or the like) and/or a similar device. Wireless sharing device 210 may send traffic to and/or receive traffic from network 260 (e.g., via base station 215, SGW 225, PGW 230, and/or ePDG 235). In some implementations, wireless sharing device 210 may provide connectivity (e.g., via a WLAN, such as a Wi-Fi network, a Bluetooth network, or the like) between user device 205 and base station 215. In some implementations, wireless sharing device 210 may be a user device 205 configured as a wireless hotspot in order to provide another user device 205 with access to network 260 via base station 215.

Base station 215 may include one or more devices capable of transferring traffic, such as audio, video, text, and/or other traffic, destined for and/or received from user device 205 via wireless sharing device 210. In some implementations, base station 215 may include an EnodeB (eNB) associated with the LTE network that receives traffic from and/or sends traffic to network 260 via SGW 225 and/or PGW 230. Additionally, or alternatively, one or more base stations 215 may be associated with a radio access network (RAN) that is not associated with the LTE network. Base station 215 may send traffic to and/or receive traffic from wireless sharing device 210 via an air interface. In some implementations, base station 215 may include a small cell base station, such as a base station of a microcell, a picocell, and/or a femtocell.

MME 220 may include one or more devices, such as one or more server devices, capable of managing authentication, activation, deactivation, and/or mobility functions associated with user device 205 and/or wireless sharing device 210. In some implementations, MME 220 may perform operations relating to authentication of user device 205 and/or wireless sharing device 210. Additionally, or alternatively, MME 220 may facilitate the selection of a particular SGW 225, a particular PGW 230, and/or a particular ePDG 235 to serve traffic to and/or from user device 205 and/or wireless sharing device 210. MME 220 may perform operations associated with handing off wireless sharing device 210 from a first base station 215 to a second base station 215 when wireless sharing device 210 is transitioning from a first cell associated with the first base station 215 to a second cell associated with the second base station 215. Additionally, or alternatively, MME 220 may select another MME (not pictured), to which wireless sharing device 210 should be handed off (e.g., when wireless sharing device 210 moves out of range of MME 220).

SGW 225 may include one or more devices capable of routing packets. For example, SGW 225 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 225 may aggregate traffic received from one or more base stations 215 associated with the LTE network, and may send the aggregated traffic to network 260 (e.g., via PGW 230) and/or other network devices associated with the Evolved Packet Core (EPC) and/or the IP Multimedia Subsystem (IMS) core. SGW 225 may also receive traffic from network 260 and/or other network devices, and may send the received traffic to wireless sharing device 210 via base station 215. Additionally, or alternatively, SGW 225 may perform operations associated with handing off wireless sharing device 210 to and/or from an LTE network.

PGW 230 may include one or more devices capable of providing connectivity for user device 205 and/or wireless sharing device 210 to external packet data networks (e.g., other than the depicted EPC and/or LTE network). For example, PGW 230 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 230 may aggregate traffic received from one or more SGWs 225, and may send the aggregated traffic to network 260. Additionally, or alternatively, PGW 230 may receive traffic from network 260, and may send the traffic to wireless sharing device 210 via SGW 225 and base station 215. PGW 230 may record data usage information (e.g., byte usage), and may provide the data usage information to AAA 250.

ePDG 235 may include one or more network devices that provide internetworking between the EPC and untrusted non-3rd Generation Partnership Project (3GPP) networks. ePDG 235 may include one or more data processing and/or traffic transfer devices, such as a gateway, a router, a modem, a switch, a firewall, a NIC, a hub, a bridge, a proxy server, or some other type of device that processes and/or transfers traffic. In some implementations, ePDG 235 may provide secure data transmissions between the EPC and other non-3GPP networks.

PCRF device 240 may include a computation and/or communication device that determines policy rules for a network. For example, PCRF device 240 may include a server or a similar device. In some implementations, PCRF device 240 may activate a set of policy rules to verify access permission to a network and/or a service, to provide a service session (e.g., a QoS-based service session), or the like. PCRF device 240 may grant network resources (e.g., components, devices, links, etc. of an LTE network) to users based on user subscriptions and/or network conditions. In some implementations, PCRF device 240 may generate, provide, and/or enforce a set of policy rules to provide a QoS-based service session based on a bearer (e.g., a default bearer, a dedicated bearer, a bearer, etc.).

HSS 245 may include one or more devices, such as one or more server devices, capable of managing (e.g., receiving, generating, storing, processing, and/or providing) information associated with user device 205 and/or wireless sharing device 210. For example, HSS 245 may manage subscription information associated with user device 205 and/or wireless sharing device 210, such as information that identifies a subscriber profile of a user associated with user device 205 and/or wireless sharing device 210, information that identifies services and/or applications that are accessible to user device 205 and/or wireless sharing device 210, location information associated with user device 205 and/or wireless sharing device 210, a network identifier (e.g., a network address) that identifies user device 205 and/or wireless sharing device 210, information that identifies a treatment of user device 205 and/or wireless sharing device 210 (e.g., quality of service information, a quantity of minutes allowed per time period, a quantity of data consumption allowed per time period, etc.), and/or similar information. HSS 245 may provide this information to one or more other devices of environment 200 to support the operations performed by those devices.

AAA 250 may include one or more devices, such as one or more server devices, that perform authentication, authorization, and/or accounting operations for communication sessions associated with user device 205 and/or wireless sharing device 210. For example, AAA 250 may perform authentication operations for user device 205 and/or wireless sharing device 210 and/or a user of user device 205 and/or wireless sharing device 210 (e.g., using one or more credentials), may control access, by user device 205 and/or wireless sharing device 210, to a service and/or an application (e.g., based on one or more restrictions, such as time-of-day restrictions, location restrictions, single or multiple access restrictions, read/write restrictions, etc.), may track resources consumed by user device 205 and/or wireless sharing device 210 (e.g., a quantity of voice minutes consumed, a quantity of data consumed, etc.), and/or may perform similar operations.

CSCF device 255 may include one or more devices, such as one or more server devices, capable of managing signal and control functions in an IMS network and/or capable of managing session initiation protocol (SIP) based services. In some implementations, CSCF device 255 may process and/or route information to and/or from user device 205 and/or wireless sharing device 210. For example, CSCF device 255 may process voice calls, received via network 260 or another network, that are destined for user device 205 and/or wireless sharing device 210, and/or may process voice calls received from user device 205 and/or wireless sharing device 210 that are destined for network 260. Additionally, or alternatively, CSCF device 255 may process and/or route information related to a QoS-based service (e.g., a VoLTE service, a video calling service, a gaming-related service, a service that requires prioritized network traffic, or the like).

Network 260 may include one or more wired and/or wireless networks. For example, network 260 may include a cellular network (e.g., an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
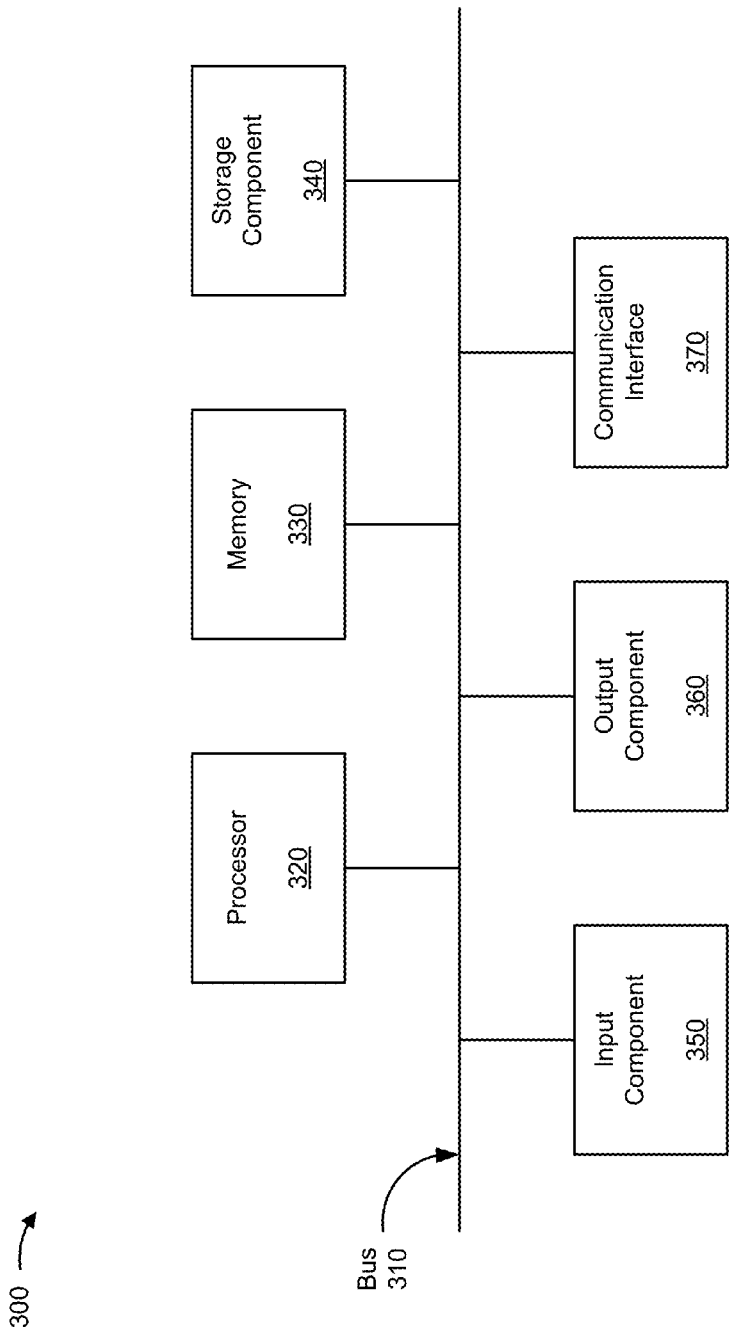
FIG. 3 is a diagram of example components of one or more devices of FIG. 2.

FIG. 3 is a diagram of example components of a device 300. Device 300 may correspond to user device 205, wireless sharing device 210, base station 215, MME 220, SGW 225, PGW 230, ePDG 235, PCRF device 240, HSS 245, AAA 250, and/or CSCF device 255. In some implementations, user device 205, wireless sharing device 210, base station 215, MME 220, SGW 225, PGW 230, ePDG 235, PCRF device 240, HSS 245, AAA 250, and/or CSCF device 255 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
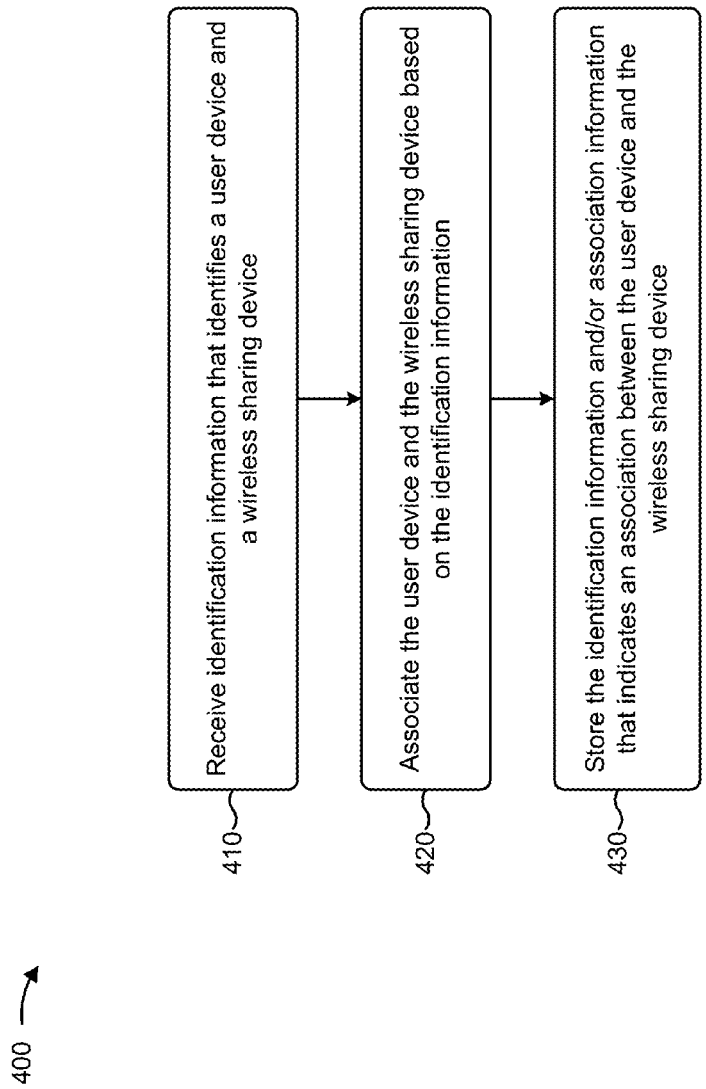
FIG. 4 is a flow chart of an example process for receiving and storing identification information and authentication information related to providing a QoS-based service using a bearer.

FIG. 4 is a flow chart of an example process 400 for receiving and storing identification information and authentication information related to providing a QoS-based service using a bearer. In some implementations, one or more process blocks of FIG. 4 may be performed by CSCF device 255. In some implementations, one or more process blocks of FIG. 4 may be performed by another device or a set of devices separate from or including CSCF device 255, such as wireless sharing device 210, base station 215, MME 220, SGW 225, PGW 230, ePDG 235, PCRF device 240, HSS 245, and/or AAA 250.

As shown in FIG. 4, process 400 may include receiving identification information that identifies a user device and a wireless sharing device (block 410). For example, CSCF device 255 may receive identification information that identifies user device 205 and wireless sharing device 210. In some implementations, CSCF device 255 may receive the identification information from wireless sharing device 210. Additionally, or alternatively, CSCF device 255 may receive the identification information from another device, such as user device 205, HSS 245, AAA 250, or the like. The identification information may be used to associate wireless sharing device 210 and user device 205. Based on the association and using a bearer, a network device (e.g., CSCF device 255, or another device) may provide a QoS-based service to user device 205 via wireless sharing device 210.

In some implementations, the identification information may include a user identifier that identifies a user of user device 205 and/or wireless sharing device 210 (e.g., a username, a subscriber identity, or the like), a user device identifier that identifies user device 205 (e.g., a mobile device number (MDN), an international mobile station equipment identity (IMEI), a mobile equipment identifier (MEID), a network address, such as an IP address or a media access control (MAC) address, or another type of network address, or the like), a wireless sharing device identifier that identifies wireless sharing device 210 (e.g., an MDN, an IMEI, an MEID, a network address, or the like), or other identification information. In some implementations, the identification information may identify a single user device 205 using a single user device identifier. In some implementations, the identification information may identify multiple, different user devices 205 using multiple user device identifiers. For example, assume that wireless sharing device 210 is connected with four user devices 205. In that case, the identification information may identify the four user devices 205 using four user device identifiers.

In some implementations, the identification information may include registration information based on wireless sharing device 210 establishing a connection with user device 205. For example, assume that wireless sharing device 210 establishes a connection with user device 205. Based on establishing the connection, wireless sharing device 210 may determine identification information that identifies user device 205 and wireless sharing device 210. Wireless sharing device 210 may provide the identification information, and registration information that associates user device 205 and wireless sharing device 210, to CSCF device 255. In this way, wireless sharing device 210 may provide registration information to CSCF device 255 based on establishing a connection with user device 205, which CSCF device 255 may use to associate wireless sharing device 210 and user device 205, in order to provide a QoS-based service to user device 205 via wireless sharing device 210.

In some implementations, user device 205 and/or wireless sharing device 210 may register information with CSCF device 255 and/or another device before providing the identification information. For example, user device 205 may register information such as a user identifier, a user device identifier, or the like, before connecting to wireless sharing device 210. In some implementations, wireless sharing device 210 may register information such as a wireless sharing device identifier, or the like. CSCF device 255 may determine an association between user device 205 and wireless sharing device 210 based on receiving identification information that includes registered information.

In some implementations, the identification information may be associated with a SIP request for a QoS-based service session. For example, assume that wireless sharing device 210 receives, from user device 205, a SIP request that includes identification information that identifies user device 205, as described in more detail below in connection with FIG. 5. Wireless sharing device 210 may provide the SIP request and the identification information to CSCF device 255. In some implementations, wireless sharing device 210 may include, with the SIP request, identification information that identifies wireless sharing device 210. In this way, user device 205 and wireless sharing device 210 may provide identification information to CSCF device 255 in association with a SIP request. CSCF device 255 may use the identification information to associate wireless sharing device 210 and user device 205, and to provide a QoS-based service to user device 205 via wireless sharing device 210.

As further shown in FIG. 4, process 400 may include associating the user device and the wireless sharing device based on the identification information (block 420). For example, CSCF device 255 may receive a wireless sharing device identifier that identifies wireless sharing device 210 in association with one or more user device identifiers that identify one or more user devices 205. Based on the wireless sharing device identifier and the one or more user device identifiers, CSCF device 255 may associate wireless sharing device 210 and the one or more user devices 205, in order to establish a bearer to provide a QoS-based service to the one or more user devices 205 via wireless sharing device 210.

In some implementations, CSCF device 255 may associate user device 205 and wireless sharing device 210 based on receiving a wireless sharing device network address in association with the identification information. For example, assume that wireless sharing device 210 provides identification information, that includes a user device identifier and a wireless sharing device identifier that identifies wireless sharing device 210, to CSCF device 255. Assume further that wireless sharing device 210 provides, with the identification information, a wireless sharing device network address associated with wireless sharing device 210. Based on receiving the identification information in association with the wireless sharing device network address, CSCF device 255 may associate the user device identifier and the wireless sharing device identifier that identifies wireless sharing device 210. In this way, CSCF device 255 may associate user device 205 and wireless sharing device 210, based on receiving identification information that identifies user device 205 and wireless sharing device 210, which may aid CSCF device 255 in providing a QoS-based service to user device 205.

As further shown in FIG. 4, process 400 may include storing the identification information and/or association information that indicates an association between the user device and the wireless sharing device (block 430). For example, CSCF device 255 may store the identification information and/or association information that indicates an association between user device 205 and wireless sharing device 210. In some implementations, CSCF device 255 may store the information locally. Additionally, or alternatively, CSCF device 255 may provide the information to another device, such as PGW 230, HSS 245, AAA 250, or another device. The identification information and/or association information may be stored in order to authenticate user device 205 and/or wireless sharing device 210, and to provide a QoS-based service to user device 205 via wireless sharing device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for providing a QoS-based service to a user device via a wireless sharing device and using a bearer. In some implementations, one or more process blocks of FIG. 5 may be performed by CSCF device 255. In some implementations, one or more process blocks of FIG. 5 may be performed by another device or a set of devices separate from or including CSCF device 255, such as user device 205, wireless sharing device 210, base station 215, MME 220, SGW 225, PGW 230, ePDG 235, PCRF device 240, HSS 245, and/or AAA 250.

As shown in FIG. 5, process 500 may include receiving a session initiation protocol (SIP) request to initiate a Quality-of-Service based (QoS-based) service session, the SIP request including identification information (block 510). For example, CSCF device 255 may receive a SIP request to initiate a QoS-based service session, via which to provide a QoS-based service. In some implementations, CSCF device 255 may receive the SIP request via wireless sharing device 210 and ePDG 235. The SIP request may include identification information associated with user device 205 and/or wireless sharing device 210, as described in more detail in connection with FIG. 4 herein.

In some implementations, CSCF device 255 may receive an original SIP request. An original SIP request may be a SIP request generated by user device 205 and provided to wireless sharing device 210. The original SIP request may request that a QoS-based service be provided to user device 205. Wireless sharing device 210 may provide the original SIP request to CSCF device 255. Additionally, or alternatively, CSCF device 255 may receive a dummy SIP request. For example, assume that wireless sharing device 210 receives an original SIP request from user device 205 that requests a particular QoS-based service to be provided to user device 205. Based on the original SIP request, wireless sharing device 210 may generate and provide, to CSCF device 255, a dummy SIP request that requests that the particular QoS-based service be provided to wireless sharing device 210. In this way, wireless sharing device 210 may cause CSCF device 255 to provide a QoS-based service to user device 205 based on an original SIP request. Additionally, or alternatively, wireless sharing device 210 may cause CSCF device 255 to provide a QoS-based service to user device 205 based on a dummy SIP request, which may be implemented using existing network devices and rules.

In some implementations, the SIP request may request multiple services. For example, assume that two user devices 205 are connected to wireless sharing device 210. Assume further that a first user device 205 provides an original SIP request for a VoLTE service, and that a second user device 205 provides an original SIP request for a video call service. Assume that the VoLTE service and the video call service are QoS-based services. Based on receiving the original SIP requests for the QoS-based services, wireless sharing device 210 may provide, to CSCF device 255, one or more SIP requests. In some implementations, wireless sharing device 210 may provide the original SIP requests. In some implementations, wireless sharing device 210 may generate and provide a dummy SIP request that requests the VoLTE service and the video call service to be provided to wireless sharing device 210.

As further shown in FIG. 5, process 500 may include authenticating a user device and/or a wireless sharing device based on the identification information (block 520). For example, CSCF device 255 may authenticate user device 205 and/or wireless sharing device 210 based on the identification information. In some implementations, CSCF device 255 may authenticate user device 205 and/or wireless sharing device 210 based on locally stored information. Additionally, or alternatively, CSCF device 255 may authenticate user device 205 and/or wireless sharing device 210 based on information stored by another device (e.g., HSS 245, AAA 250, or another device). For example, CSCF device 255 may receive information from another device based on providing a user device identifier and/or a wireless sharing device identifier to the other device, and may authenticate user device 205 and/or wireless sharing device 210 based on the received information.

CSCF device 255 may authenticate user device 205 and/or wireless sharing device 210 to determine that user device 205 is associated with wireless sharing device 210, that user device 205 and/or wireless sharing device 210 are permitted to request and/or obtain a QoS-based service, or the like. In some implementations, CSCF device 255 may perform authentication based on a number of user devices 205. For example, CSCF device 255 may not permit more than a threshold quantity (e.g., two, four, eight, etc.) of user devices 205 to concurrently receive QoS-based services via wireless sharing device 210, and may fail to authenticate wireless sharing device 210 if wireless sharing device 210 is associated with more than the threshold quantity of user devices 205. In this way, CSCF device 255 may reduce network load by limiting a number of user devices 205 accessing QoS-based services via wireless sharing device 210.

As further shown in FIG. 5, process 500 may include establishing a bearer to facilitate the QoS-based service session based on authenticating the user device and/or the wireless sharing device (block 530). For example, CSCF device 255 may establish a bearer based on authenticating user device 205 and/or wireless sharing device 210. The bearer may include information related to providing the QoS-based service via wireless sharing device 210. For example, the bearer may include a source network address (e.g., an IP address associated with a source of the network traffic, or the like), a destination network address (e.g., an IP address associated with a destination of the network traffic, or the like), a source port (e.g., a network port via which a source of the network traffic will provide the service), a destination port (e.g., a network port via which a destination of the network traffic will receive the service), a QoS class indicator (QCI) (e.g., that indicates a particular QoS class, a threshold bitrate, a threshold latency, a priority, or the like), and/or a protocol identifier (e.g., of a particular protocol associated with the service).

In some implementations, CSCF device 255 may establish the bearer based on receiving an original SIP request. For example, user device 205 may provide, to CSCF device 255 and via wireless sharing device 210, a SIP request for a QoS-based service. Based on receiving the SIP request, CSCF device 255 may authenticate user device 205 by determining that user device 205 is associated with wireless sharing device 210 and may establish a bearer to cause one or more network devices (e.g., MME 220, SGW 225, PGW 230, ePDG 235, or the like) to provide the QoS-based service to user device 205 via wireless sharing device 210. In some implementations, CSCF device 255 may establish the bearer based on a dummy SIP request. For example, assume that wireless sharing device 210 provides a dummy SIP request for a VoLTE service to CSCF device 255. CSCF device 255 may establish a bearer based on the dummy SIP request. The bearer may cause one or more network devices to provide the VoLTE service to wireless sharing device 210. In this way, wireless sharing device 210 may cause CSCF device 255 to establish a bearer to provide a service to user device 205 via wireless sharing device 210, which may be implemented using existing network devices and rules.

In some implementations, the bearer may include a QCI. A QCI may include information related to providing a particular guaranteed bitrate, a particular latency, and/or a particular priority for a QoS-based service. For example, assume that a QCI of 2 is associated with a latency of 150 milliseconds (ms), a particular guaranteed bitrate, and a first priority. Assume further that a QCI of 7 is associated with a latency of 100 ms, no particular guaranteed bitrate, and a second priority. Assume that a first bearer for a first service includes the QCI of 2, and that a second bearer for a second service includes the QCI of 7. Based on the first bearer, one or more network devices (e.g., MME 220, SGW 225, PGW 230, ePDG 235, or the like) may provide the particular guaranteed bitrate and the latency of 150 ms for network traffic associated with the first service. Based on the second bearer, the one or more network devices may provide the latency of 100 ms for network traffic associated with the second service, but may not provide a particular guaranteed bitrate. The one or more network devices may prioritize the network traffic associated with the first service and the network traffic associated with the second service based on the first bearer and the second bearer and on the relative priorities of the first service and the second service.

In some implementations, a device (e.g., PCRF device 240, CSCF device 255, or another device) may establish a default bearer. A default bearer may cause one or more network devices to route network traffic to user device 205 and/or wireless sharing device 210 based on a default network policy rule. For example, CSCF device 255, or another device, may establish a default bearer to wireless sharing device 210 (e.g., based on wireless sharing device 210 establishing a connection with base station 215, or the like). In some implementations, a default bearer may not include a guaranteed bitrate for network traffic. For example, the default bearer may include a QCI of 5, 6, 7, 8, or 9, which do not provide a particular guaranteed bitrate.

In some implementations, a device (e.g., PCRF device 240, CSCF device 255, or another device) may establish a dedicated bearer. A dedicated bearer may cause one or more network devices to route network traffic to user device 205 and/or wireless sharing device 210 based on a non-default network policy rule. For example, CSCF device 255, or another device, may establish a dedicated bearer to wireless sharing device 210 (e.g., based on wireless sharing device 210 providing a SIP request, or the like). In some implementations, a dedicated bearer may provide a particular guaranteed bitrate for network traffic. For example, the dedicated bearer may include a QCI of 1, 2, 3, or 4, which provide a particular guaranteed bitrate. In some implementations, the dedicated bearer may not provide a particular guaranteed bitrate for network traffic. For example, the dedicated bearer may include a QCI of 5, 6, 7, 8, or 9, which do not provide a particular guaranteed bitrate.

In some implementations, wireless sharing device 210 may cause another device (e.g., MME 220, CSCF device 255, or another device) to establish a dedicated bearer between the LTE network and wireless sharing device 210. For example, wireless sharing device 210 may cause the other device to establish the dedicated bearer based on an event, such as powering on of wireless sharing device 210, receiving a SIP request from user device 205, or the like. The dedicated bearer may be associated with a QoS-based service (e.g., a VoLTE service, a video calling service, or the like) and may cause one or more network devices to provide the particular QoS and/or priority required by the QoS-based service. Additionally, or alternatively, the dedicated bearer may not be associated with a QoS-based service. For example, the dedicated bearer may include a QCI of 7, which may not provide a particular guaranteed bitrate. In this way, wireless sharing device 210 may cause another device to establish a dedicated bearer to wireless sharing device 210, which may facilitate providing the QoS-based service to user device 205.

As further shown in FIG. 5, process 500 may include providing information that describes the bearer for generation of network policy rules (block 540). For example, CSCF device 255 may provide information that describes the bearer to PCRF device 240. Based on the information that describes the bearer, PCRF device 240 may generate one or more network policy rules for providing the QoS-based service session and the quality of service associated with the bearer. In some implementations, PCRF device 240 may provide the one or more network policy rules to one or more network devices (e.g., MME 220, SGW 225, PGW 230, ePDG 235, or the like) for execution and/or enforcement.

In some implementations, a network policy rule may cause one or more network devices to provide the quality of service to wireless sharing device 210 and user device 205. For example, assume that a QoS-based service requires a particular bitrate of network traffic. PCRF device 240 may generate a network policy rule, using a bearer associated with the QoS-based service, that causes one or more network devices to provide the particular bitrate of network traffic, in association with the QoS-based service, to wireless sharing device 210 and user device 205. In this way, the bearer may ensure that user device 205, via wireless sharing device 210, receives the quality of service associated with the QoS-based service.

As further shown in FIG. 5, process 500 may include receiving a release indicator that indicates to release the bearer (block 550). For example, CSCF device 255 may receive a release indicator that indicates to release the bearer. In some implementations, the release indicator may be received based on a cessation of network traffic associated with the QoS-based service. In some implementations, CSCF device 255 may generate the release indicator. For example, CSCF device 255 may detect the cessation of network traffic associated with the QoS-based service, and may generate the release indicator based on detecting the cessation.

In some implementations, CSCF device 255 may receive a release indicator from PCRF device 240. For example, PCRF device 240 may determine that the bearer is ready to release. In some implementations, PCRF device 240 may determine that the bearer is ready to release based on an indicator received from user device 205 and/or wireless sharing device 210, based on a cessation of network traffic via the QoS-based service session associated with the bearer, or the like. In that case, PCRF device 240 may generate and provide, to CSCF device 255, a release indicator.

In some implementations, CSCF device 255 may receive a release indicator from user device 205 and/or wireless sharing device 210. For example, assume that user device 205 receives a VoLTE service via wireless sharing device 210. Assume further that user device 205 ends a call provided by the VoLTE service. In some implementations, user device 205 may provide, via wireless sharing device 210 and to CSCF device 255, a release indicator. In some implementations, wireless sharing device 210 may detect that the VoLTE service session is ready to close (e.g., based on an end of the call provided by the VoLTE service, based on a cessation of network traffic flow associated with the VoLTE service, or the like). Based on detecting that the VoLTE service session is ready to close, wireless sharing device 210 may provide, to CSCF device 255, a release indicator. In this way, user device 205 and/or wireless sharing device 210 may conserve network resources that would otherwise be used by CSCF device 255 to determine that the QoS-based service session is ready to close.

As further shown in FIG. 5, process 500 may include releasing the bearer based on the release indicator (block 560). For example, CSCF device 255 may release the bearer based on the release indicator. In some implementations, CSCF device 255 may release the bearer by providing an instruction to one or more network devices in the LTE network to cease providing a QoS-based service associated with the bearer, may provide an instruction to cease routing network traffic based on the bearer, or the like.

In some implementations, CSCF device 255 may provide an instruction to another device to release the bearer, such as PCRF device 240. For example, assume that PCRF device 240 generates one or more network policy rules based on the bearer. Assume further that PCRF device 240 provides the one or more network policy rules to one or more network devices (e.g., MME 220, SGW 225, PGW 230, ePDG 235, or the like). In some implementations, CSCF device 255 may provide an instruction to PCRF device 240 to release the bearer. In that case, PCRF device 240 may provide an instruction to the one or more network devices to cease enforcing the one or more network policy rules, thus releasing the bearer. In this way, CSCF device 255 may cause another device to release the bearer.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIGS. 6A-6D are diagrams of an example implementation 600 relating to example processes 400 and 500, shown in FIGS. 4 and 5. FIGS. 6A-6D show an example of receiving authentication information and identification information related to providing a QoS-based service using a bearer, and of providing a QoS-based service to user device 205 via wireless sharing device 210 and using a bearer. For the purpose of FIGS. 6A-6D, assume that user device 205 is incapable of directly connecting to an LTE network (e.g., via a connection with base station 215), that user device 205 is connected to wireless sharing device 210 via a WLAN, and that wireless sharing device 210 is connected to the LTE network ((e.g., via a connection with base station 215). Assume further that CSCF device 255 stores information that indicates that wireless sharing device 210 is a wireless hotspot (e.g., CSCF device 255 stores an IP address associated with wireless sharing device 210).

Figure 6A:
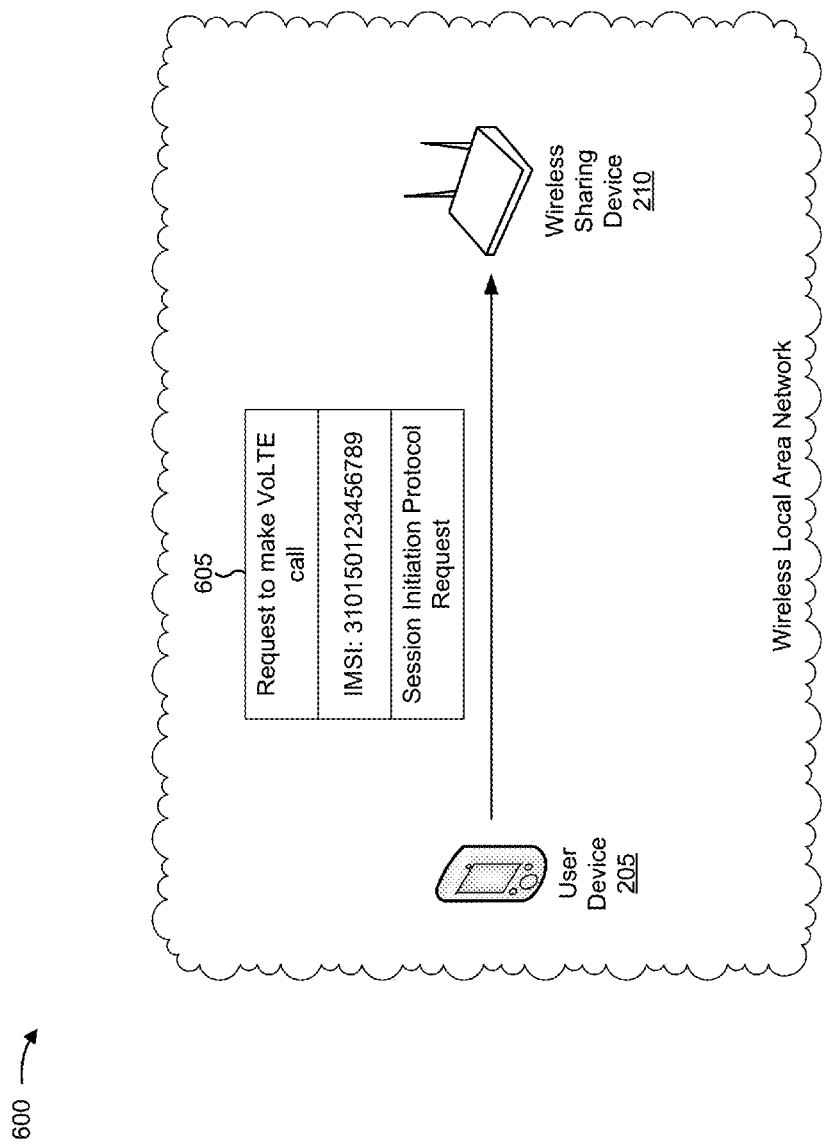
FIGS. 6A-6D are diagrams of an example implementation relating to the example processes shown in FIGS. 4 and 5.

As shown in FIG. 6A, and by reference number 605, assume that user device 205 provides a SIP request, to wireless sharing device 210, to access a VoLTE service. Assume that the SIP request includes identification information (e.g., an international mobile subscriber identity (IMSI) of 310150123456789 that identifies user device 205). Assume further that wireless sharing device 210 receives the SIP request.

Figure 6B:
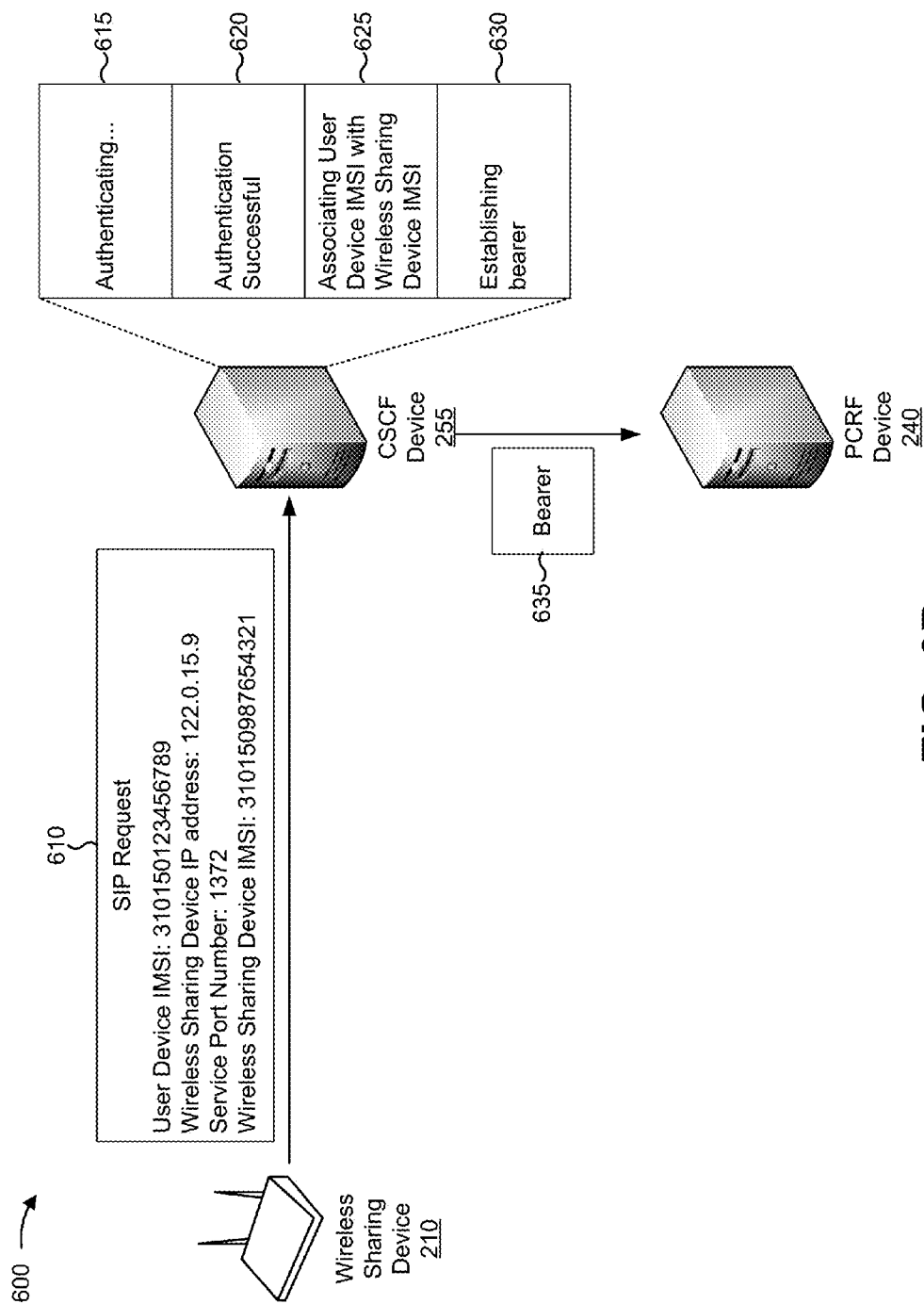

As shown in FIG. 6B, and by reference number 610, based on receiving the SIP request, wireless sharing device 210 may provide the SIP request to CSCF device 255. As further shown, wireless sharing device 210 may include, with the SIP request, additional identification information (e.g., an internet protocol (IP) address of 122.0.15.9 associated with wireless sharing device 210, a service port number of 1372 associated with the VoLTE service, an IMSI of 310150987654321 associated with wireless sharing device 210, or the like). As further shown, assume that CSCF device 255 receives the SIP request.

As shown by reference number 615, CSCF device 255 may authenticate user device 205 and/or wireless sharing device 210. Assume that CSCF device 255 authenticates user device 205 and wireless sharing device 210 by determining that the IP address provided with the SIP request is associated with wireless sharing device 210, by further determining that wireless sharing device 210 is a wireless hotspot, and by further determining that user device 205 is authorized to access the VoLTE service (e.g., based on information stored by HSS 245, AAA 250, or another device). As shown by reference number 620, CSCF device 255 may successfully authenticate user device 205 and wireless sharing device 210. As shown by reference number 625, CSCF device 255 may store information that indicates an association between user device 205 and wireless sharing device 210, to facilitate establishing the bearer to provide the VoLTE service to user device 205 via wireless sharing device 210.

As shown by reference number 630, CSCF device 255 may establish a bearer based on the SIP request and based on successfully authenticating user device 205 and wireless sharing device 210. As shown by reference number 635, CSCF device 255 may provide information that describes the bearer to PCRF device 240. Assume that PCRF device 240 receives the information that describes the bearer (e.g., a source IP address, a destination IP address, a source network port, a destination network port, a QCI, and/or a protocol identifier).

Figure 6C:
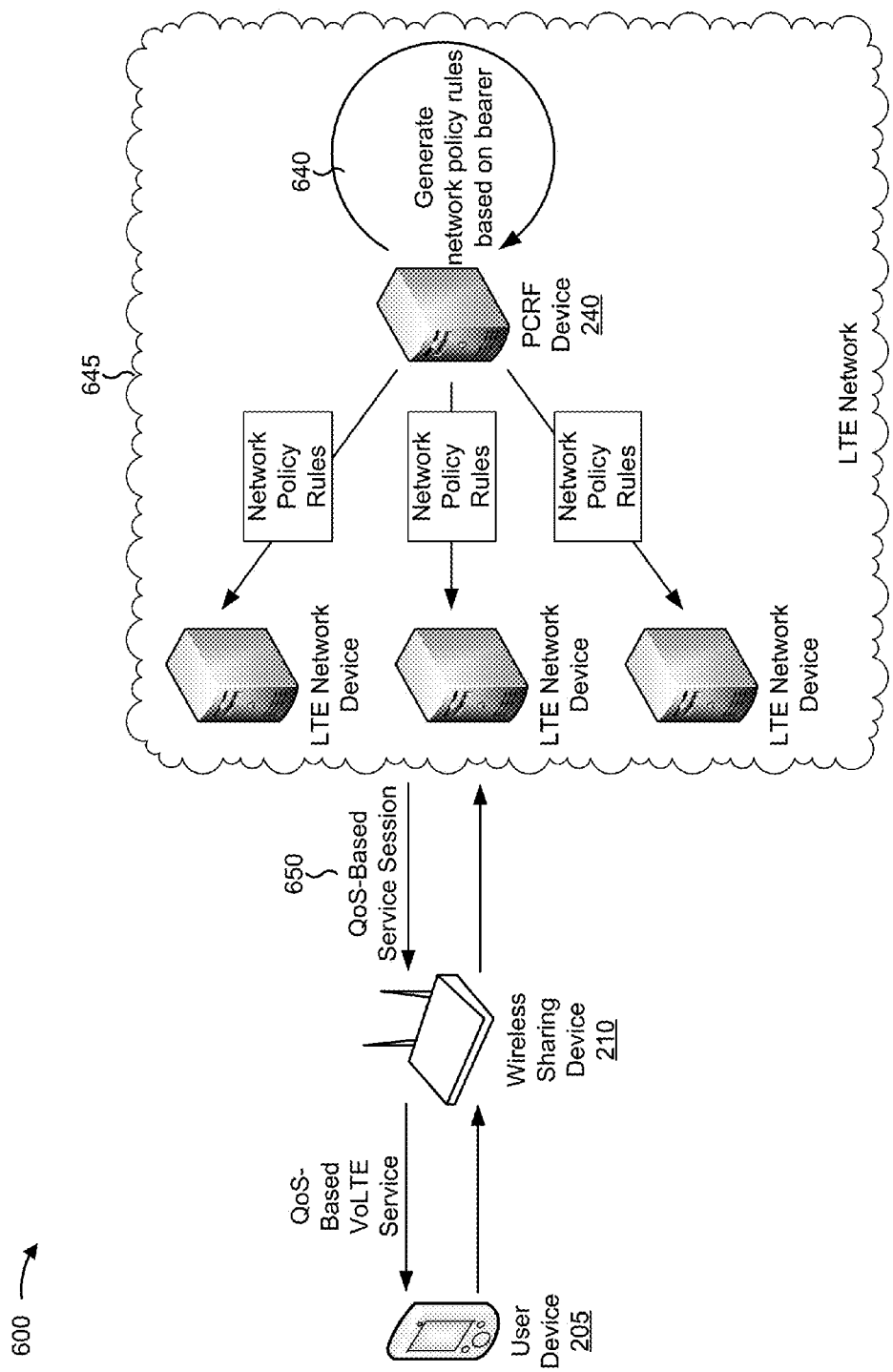

As shown in FIG. 6C, and by reference number 640, PCRF device 240 may generate network policy rules based on the information that describes the bearer. As shown by reference number 645, PCRF device 240 may provide the network policy rules to one or more network devices (e.g., MME 220, SGW 225, PGW 230, ePDG 235, or the like). As shown by reference number 650, the one or more network devices may provide, to wireless sharing device 210, the QoS-based service session. Assume that the one or more network devices provide the QoS-based service session based on the network policy rules. As further shown, user device 205 may receive, via wireless sharing device 210, the VoLTE service associated with the QoS-based service session.

Figure 6D:
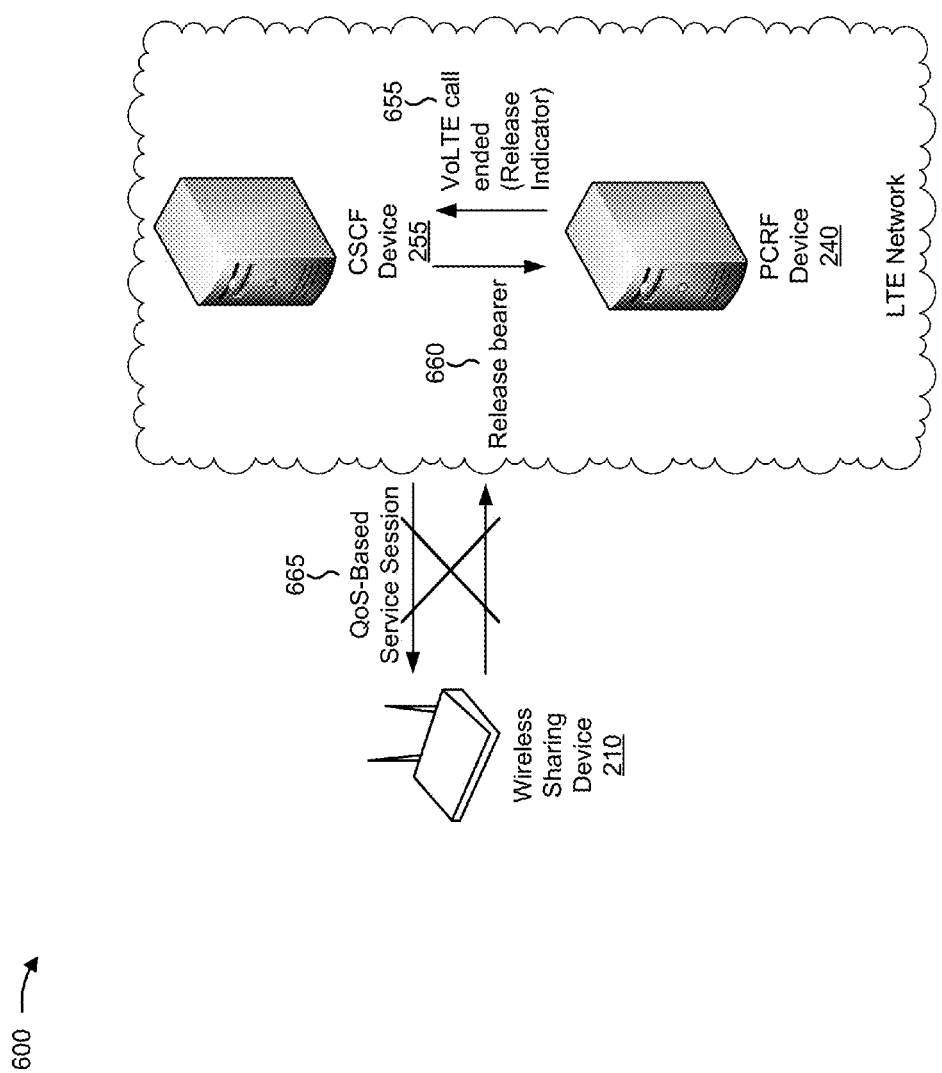

For the purpose of FIG. 6D, assume that the VoLTE service ends. As shown in FIG. 6D, and by reference number 655, PCRF device 240 may provide, to CSCF device 255, a release indicator that indicates to release the bearer. Assume that PCRF device 240 provides the release indicator based on the VoLTE service ending. As shown by reference number 660, CSCF device 255 may cause PCRF device 240 to release the bearer based on receiving the release indicator. Assume that PCRF device 240 causes the one or more network devices to cease enforcing the network policy rules. As shown by reference number 665, the QoS-based service session may end based on CSCF device 255 causing PCRF device 240 to release the bearer.

As indicated above, FIGS. 6A-6D are provided merely as an example. Other examples are possible and may differ from what was described with regard to FIGS. 6A-6D.

In this way, an LTE network provider may provide, to a user device or multiple user devices that are not directly connected to the LTE network, a QoS-based service via a wireless sharing device that provides the user device(s) with access to the LTE network.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device associated with a cellular network, the device comprising:
a memory storing instructions; and
one or more processors to execute the instructions to:
receive a request for a particular quality-of-service based service from a wireless sharing device in communication with a user device that connects with the cellular network via the wireless sharing device,
the request being received based on the cellular network not providing the particular quality-of-service based service to the wireless sharing device,
the particular quality-of-service based service not being provided to the wireless sharing device based on the cellular network not recognizing that the particular quality-of-service based service is to be provided to the user device via the wireless sharing device,
the request for the particular quality-of-service based service including identification information,
the identification information including a user device identifier and a wireless sharing device identifier,
the particular quality-of-service based service to be provided using an identified quality-of-service level,
the particular quality-of-service based service including at least one of:
a video calling service,
a Voice over Long-Term Evolution service (VoLTE), or
a video streaming service, and
the identified quality-of-service level including at least one of:
a particular bitrate for network traffic associated with the service, or
a particular latency of the network traffic associated with the service; and
cause a bearer to be established, based on the request for the particular quality-of-service based service, to cause the particular quality-of-service based service to be provided to the user device via the wireless sharing device,
one or more network policy rules being defined by the bearer to cause the particular quality-of-service based service to be provided, by one or more network devices to the user device, via the wireless sharing device, with the identified quality-of-service level, and
the one or more network policy rules being provided, by the device to the one or more network devices of the cellular network, to cause the particular quality-of-service based service to be provided to the user device via the wireless sharing device.

2. The device of claim 1, where the one or more processors are further to:
receive registration information associated with the wireless sharing device,
the registration information including the wireless sharing device identifier and the user device identifier, and
the registration information indicating an association between the wireless sharing device identifier and the user device identifier; and
where the one or more processors, when causing the bearer to be established, are to:
cause the bearer to be established based on the registration information.

3. The device of claim 1, where the wireless sharing device is associated with a wireless sharing device network address; and
where the one or more processors, when receiving the request for the particular quality-of-service based service, are to:
receive the wireless sharing device network address in association with the request for the particular quality-of-service based service; and
where the one or more processors, when causing the bearer to be established, are to:
cause the bearer to be established based on receiving the wireless sharing device network address in association with the request for the particular quality-of-service based service, and based on the user device identifier being included in the request for the particular quality-of-service based service.

4. The device of claim 1, where the request for the particular quality-of-service based service is an original request,
the original request requesting the particular quality-of-service based service to be provided to the user device, and
the original request being generated by the user device; and
where the one or more processors, when receiving the original request, are to:
receive the original request from the wireless sharing device,
the original request being provided by the wireless sharing device based on receiving the original request from the user device.

5. The device of claim 1, where the request for the particular quality-of-service based service is a dummy request;
where the dummy request is generated by the wireless sharing device,
the dummy request being generated based on an original request for the particular quality-of-service based service,
the original request being received by the wireless sharing device from the user device; and
where the one or more processors, when causing the bearer to be established, are to:

cause the bearer to be established based on the dummy request.

6. The device of claim 1, where the one or more processors are further to:
receive a bearer request, for a dedicated bearer, from the wireless sharing device; and
cause the dedicated bearer to be established based on the bearer request,
the dedicated bearer causing the one or more network devices to route network traffic to or from the wireless sharing device; and
where the one or more processors, when receiving the request for the particular quality-of-service based service, are to:
receive, based on the dedicated bearer being established, the request for the particular quality-of-service based service.

7. The device of claim 1, where the identification information identifies a quantity of user devices; and
where the one or more processors, when causing the bearer to be established, are to:
selectively cause the bearer to be established based on the quantity of user devices,
the bearer being established if the quantity satisfies a threshold, and
the bearer not being established if the quantity does not satisfy the threshold.

8. A computer-readable medium storing instructions, the instructions comprising:
one or more instructions that, when executed by one or more processors of a device, cause the one or more processors to:
receive a request for a particular quality-of-service based service from a wireless sharing device in communication with a user device that connects with a cellular network via the wireless sharing device,
the request being received based on the cellular network not providing the particular quality-of-service based service to the wireless sharing device,
the particular quality-of-service based service not being provided to the wireless sharing device based on the cellular network not recognizing that the particular quality-of-service based service is to be provided to the user device via the wireless sharing device,
the request for the particular quality-of-service based service including identification information,
the identification information including a user device identifier and a wireless sharing device identifier,
the particular quality-of-service based service to be provided using an identified quality-of-service level,
the particular quality-of-service based service including at least one of:
a video calling service,
a Voice over Long-Term Evolution service (VoLTE), or
a video streaming service, and
the identified quality-of-service level including at least one of:
a particular bitrate for network traffic associated with the service, or
a particular latency of the network traffic associated with the service; and
cause a bearer to be established, based on the request for the particular quality-of-service based service, to cause the particular quality-of-service based service to be provided to the user device via the wireless sharing device,
one or more network policy rules being defined by the bearer to cause the particular quality-of-service based service to be provided, by one or more network devices to the user device, via the wireless sharing device, with the identified quality-of-service level, and
the one or more network policy rules being provided, by the device to the one or more network devices of the cellular network, to cause the particular quality-of-service based service to be provided to the user device via the wireless sharing device.

9. The computer-readable medium of claim 8, where the wireless sharing device is associated with a wireless sharing device network address; and
where the one or more instructions, that cause the one or more processors to receive the request for the particular quality-of-service based service, cause the one or more processors to:
receive the wireless sharing device network address in association with the request for the particular quality-of-service based service; and
where the one or more instructions, that cause the one or more processors to cause the bearer to be established, cause the one or more processors to:
cause the bearer to be established based on receiving the wireless sharing device network address in association with the request for the particular quality-of-service based service, and based on the user device identifier being included in the request for the particular quality-of-service based service.

10. The computer-readable medium of claim 8, where the one or more instructions, when executed by the one or more processors, further cause the one or more processors to:
receive registration information from the wireless sharing device,
the registration information including the wireless sharing device identifier and the user device identifier, and
the registration information indicating an association between the wireless sharing device identifier and the user device identifier; and
where the one or more instructions, that cause the one or more processors to cause the bearer to be established, cause the one or more processors to:
cause the bearer to be established based on the registration information.

11. The computer-readable medium of claim 8, where the identification information identifies a quantity of user devices; and
where the one or more instructions, that cause the one or more processors to cause the bearer to be established, cause the one or more processors to:
selectively cause the bearer to be established based on the quantity of user devices,
the bearer being established if the quantity satisfies a threshold, and
the bearer not being established if the quantity does not satisfy the threshold.

12. The computer-readable medium of claim 8, where the request for the particular quality-of-service based service is an original request,
the original request requesting the particular quality-of-service based service to be provided to the user device, and the original request being generated by the user device; and
where the one or more instructions, that cause the one or more processors to receive the original request, cause the one or more processors to:
receive the original request from the wireless sharing device,
the original request being provided by the wireless sharing device based on receiving the original request from the user device.

13. The computer-readable medium of claim 8, where the one or more instructions, when executed by the one or more processors, further cause the one or more processors to:
receive a bearer request, for a dedicated bearer, from the wireless sharing device; and
cause the dedicated bearer to be established based on the bearer request,
the dedicated bearer causing the one or more network devices to route network traffic from the wireless sharing device; and
where the one or more instructions, that cause the one or more processors to receive the request for the particular quality-of-service based service, cause the one or more processors to:
receive, based on the dedicated bearer being established, the request for the particular quality-of-service based service.

14. The computer-readable medium of claim 8, where the request for the particular quality-of-service based service is a dummy request;
where the dummy request is generated by the wireless sharing device,
the dummy request being generated based on an original request for the particular quality-of-service based service,
the original request being received by the wireless sharing device from the user device; and
where the one or more instructions, that cause the one or more processors to cause the bearer to be established, cause the one or more processors to:
cause the bearer to be established based on the dummy request.

15. A method, comprising:
receiving, by a device associated with a cellular network, a request for a particular quality-of-service based service from a wireless sharing device in communication with a user device that connects with the cellular network via the wireless sharing device,
the request being received based on the cellular network not providing the particular quality-of-service based service to the wireless sharing device,
the particular quality-of-service based service not being provided to the wireless sharing device based on the cellular network not recognizing that the particular quality-of-service based service is to be provided to the user device via the wireless sharing device,
the request for the particular quality-of-service based service including identification information,
the identification information including a user device identifier and a wireless sharing device identifier,
the particular quality-of-service based service to be provided using an identified quality-of-service level,
the particular quality-of-service based service including at least one of:
a video calling service,
a Voice over Long-Term Evolution service (VoLTE), or
a video streaming service, and
the identified quality-of-service level including at least one of:
a particular bitrate for network traffic associated with the service, or
a particular latency of the network traffic associated with the service; and
causing, by the device, a bearer to be established, based on the request for the particular quality-of-service based service, to cause the particular quality-of-service based service to be provided to the user device via the wireless sharing device,
one or more network policy rules being defined by the bearer to cause the particular quality-of-service based service to be provided, by one or more network devices to the user device, via the wireless sharing device, with the identified quality-of-service level, and
the one or more network policy rules being provided, by the device to the one or more network devices of the cellular network, to cause the particular quality-of-service based service to be provided to the user device via the wireless sharing device.

16. The method of claim 15, further comprising:
receiving registration information from the wireless sharing device,
the registration information including the wireless sharing device identifier and the user device identifier, and
the registration information indicating an association between the wireless sharing device identifier and the user device identifier; and
where causing the bearer to be established comprises:
causing the bearer to be established based on the registration information.

17. The method of claim 15, where the wireless sharing device is associated with a wireless sharing device network address;
where receiving the request for the particular quality-of-service based service comprises:
receiving the wireless sharing device network address in association with the request for the particular quality-of-service based service; and
where causing the bearer to be established comprises:
causing the bearer to be established based on receiving the wireless sharing device network address in association with the request for the particular quality-of-service based service, and based on the user device identifier being included in the request for the particular quality-of-service based service.

18. The method of claim 15, where the request for the particular quality-of-service based service is a dummy request;
where the dummy request is generated by the wireless sharing device,
the dummy request being generated based on an original request for the particular quality-of-service based service,
the original request being received by the wireless sharing device from the user device; and
where causing the bearer to be established comprises:
causing the bearer to be established based on the dummy request.

19. The method of claim 15, where the request for the particular quality-of-service based service is an original request,
   the original request requesting the particular quality-of-service based service to be provided to the user device, and
   the original request being generated by the user device; and
   where receiving the original request comprises:
      receiving the original request from the wireless sharing device,
         the original request being provided by the wireless sharing device based on receiving the original request from the user device.

20. The method of claim 15, where the identification information identifies a quantity of user devices; and
   where causing the bearer to be established comprises:
      selectively causing the bearer to be established based on the quantity of user devices,
         the bearer being established if the quantity satisfies a threshold, and
         the bearer not being established if the quantity does not satisfy the threshold.

\* \* \* \* \*